(12) United States Patent
Bavishi et al.

(10) Patent No.: US 9,594,591 B2
(45) Date of Patent: Mar. 14, 2017

(54) DYNAMIC RELOCATION OF APPLICATIONS IN A CLOUD APPLICATION SERVICE MODEL

(71) Applicant: International Business Machines Corporation, Armonk, NY (US)

(72) Inventors: Pankaj S. Bavishi, Pune (IN); Ramani R. Routray, San Jose, CA (US); Esha Seth, Pradesh (IN); Riyazahamad M. Shiraguppi, Pune (IN)

(73) Assignee: International Business Machines Corporation, Armonk, NY (US)

(*) Notice: Subject to any disclaimer, the term of this patent is extended or adjusted under 35 U.S.C. 154(b) by 50 days.

(21) Appl. No.: 14/497,381

(22) Filed: Sep. 26, 2014

(65) Prior Publication Data
US 2016/0092266 A1 Mar. 31, 2016

(51) Int. Cl.
*G06F 9/455* (2006.01)
*G06F 9/48* (2006.01)
*G06F 9/50* (2006.01)
*G06F 9/52* (2006.01)

(52) U.S. Cl.
CPC ........ *G06F 9/4856* (2013.01); *G06F 9/45533* (2013.01); *G06F 9/505* (2013.01); *G06F 9/52* (2013.01)

(58) Field of Classification Search
CPC ... G06F 9/45533; G06F 9/4843; G06F 9/4856
USPC ...................................................... 718/1, 100
See application file for complete search history.

(56) References Cited

U.S. PATENT DOCUMENTS

| | | | |
|---|---|---|---|
| 6,698,017 B1* | 2/2004 | Adamovits | G06F 8/67 717/168 |
| 7,370,233 B1 | 5/2008 | Sobel et al. | |
| 8,423,646 B2 | 4/2013 | Jamjoom et al. | |
| 2005/0097508 A1* | 5/2005 | Jacovi | G06F 9/4446 717/103 |
| 2005/0204349 A1* | 9/2005 | Lewis | G06F 9/45516 717/162 |
| 2006/0155912 A1* | 7/2006 | Singh | G06F 9/5088 711/6 |

(Continued)

FOREIGN PATENT DOCUMENTS

WO 2013002777 A1 1/2013

OTHER PUBLICATIONS

Liu et al., "Live Migration of Virtual Machine Based on Full System Trace and Replay", 2009.*

(Continued)

*Primary Examiner* — Phillip H Nguyen
(74) *Attorney, Agent, or Firm* — William H. Hartwell

(57) ABSTRACT

Software that performs the following steps: (i) running a first customer application on a first set of virtual machine(s), with the first customer application including a first plurality of independently migratable elements, including a first independently migratable element and a second independently migratable element; (ii) dynamically checking a status of the first set of virtual machine(s) to determine whether a first migration condition exists; and (iii) on condition that the first migration condition exists, migrating the first independently migratable element to a second set of virtual machine(s) without migrating the second independently migratable element to the second set of virtual machine(s).

20 Claims, 12 Drawing Sheets

(56) References Cited

U.S. PATENT DOCUMENTS

| | | | | |
|---|---|---|---|---|
| 2006/0230407 | A1* | 10/2006 | Rosu | G06F 9/5088 |
| | | | | 718/105 |
| 2007/0283321 | A1* | 12/2007 | Hegde | G06F 8/71 |
| | | | | 717/110 |
| 2008/0134298 | A1* | 6/2008 | Nathan | G06F 8/20 |
| | | | | 726/4 |
| 2008/0184229 | A1* | 7/2008 | Rosu | G06F 9/5088 |
| | | | | 718/1 |
| 2009/0165133 | A1* | 6/2009 | Hwang | G06F 21/53 |
| | | | | 726/22 |
| 2011/0202734 | A1 | 8/2011 | Dhakras et al. | |
| 2012/0227058 | A1 | 9/2012 | Hunt et al. | |
| 2013/0219043 | A1 | 8/2013 | Steiner et al. | |
| 2013/0247004 | A1* | 9/2013 | DeLuca | G06F 15/16 |
| | | | | 717/120 |
| 2014/0258894 | A1* | 9/2014 | Brown | G06F 8/38 |
| | | | | 715/762 |
| 2014/0258968 | A1* | 9/2014 | Brown | G06F 17/21 |
| | | | | 717/103 |
| 2014/0258969 | A1* | 9/2014 | Brown | G06F 8/30 |
| | | | | 717/103 |
| 2014/0258970 | A1* | 9/2014 | Brown | G06F 8/47 |
| | | | | 717/103 |
| 2014/0359103 | A1* | 12/2014 | Dalmau | H04L 67/34 |
| | | | | 709/223 |
| 2016/0224337 | A1* | 8/2016 | Xia | G06F 8/71 |

OTHER PUBLICATIONS

Meiosys, Inc. "Meiosys Releases MetaCluster UC Version 3.0", PR Newswire, Palo Alto, CA, Jan. 24, URL provided by searcher in report dated Mar. 12, 2014, <http://www.prnewswire.com/news-releases/meiosys-releases-metacluster-uc-version-30-54095017.html>.

"Bin-packing problem", Chapter 8, pp. 221-245, URL provided by Inventor in Main Idea of Disclosure dated Dec. 10, 2013, <http://www.or.deis.unibo.it/kp/Chapter8.pdf>.

* cited by examiner

1100

| VM | COMPUTING POWER | STORAGE CONNECTIVITY DIRECT | STORAGE CONNECTIVITY SHARED | NETWORK CONNECTIVITY |
|---|---|---|---|---|
| 1 | 4 CPU 16 GHz | StorageController 1 (1 TB) | StorageController 3 (SHARED 1 TB) | TWO 1 Gbps PORT |
| 2 | 4 CPU 16 GHz | StorageController 2 (1 TB) | StorageController 3 (SHARED 1 TB) | ONE 1 Gbps PORT |
| 3 | 4 CPU 16 GHz | StorageController 4 (1 TB) | StorageController 3 (SHARED 1 TB) | ONE 1 Gbps PORT |

| VM | APPLICATION RUNNING | COMPUTING USAGE | STORAGE USAGE | NETWORK USAGE |
|---|---|---|---|---|
| 1 | APP1, APP2, APP3, APP4 | 60% | StorageController1(20%), StorageController3(30%) | 10% PORT1 30% PORT2 |
| 2 | APP5 | 20% | StorageController2(30%), StorageController3(40%) | 40% PORT |
| 3 | APP6 | 20% | StorageController4(20%), StorageController3(20%) | 20% PORT |

| CUSTOMER ID | APP ID | VM-LOVATION |
|---|---|---|
| 1 | 1 | VM1 |
| 1 | 2 | VM1 |
| 1 | 5 | VM2 |
| 2 | 3 | VM1 |
| 2 | 4 | VM1 |
| 3 | 6 | VM3 |

| APP ID | COMPUTING INTENSITY RANGE (0 MIN - 10 MAX) MIN TO MAX | STORAGE (MIN TO MAX) | NETWORK (MIN TO MAX) |
|---|---|---|---|
| APP1 | 2-4 | 20 TO 100 GB | 6-10 MB/s |
| APP2 | 1-2 | 1 TO 300 GB | 10-20 MB/s |
| APP3 | 2-4 | 10 TO 20 GB | 10-15 MB/s |
| APP4 | 4-6 | 10 TO 300 GB | 5-10 MB/s |
| APP5 | 2-3 | 20 TO 100 GB | 1-2 MB/s |
| APP6 | 6-9 | 1 TO 300 GB | 8-10 MB/s |

1500

| APP ID | COMPUTING USAGE (0 MIN - 10 MAX) | STORAGE USAGE | NETWORK USAGE |
|---|---|---|---|
| APP1 | 4 | 35 GB | 2 MB/s |
| APP2 | 2 | 10 GB | 10 MB/s |
| APP3 | 2 | 12 GB | 8 MB/s |
| APP4 | 4 | 110 GB | 12 MB/s |
| APP5 | 2 | 50 GB | 4.5 MB/s |
| APP6 | 2 | 123 GB | 8 MB/s |

| CUSTOMER ID | ALLOWABLE VM |
|---|---|
| 1 | VM1, VM2 |
| 2 | VM1, VM2 |

FIG. 16

DYNAMIC RELOCATION OF APPLICATIONS IN A CLOUD APPLICATION SERVICE MODEL

BACKGROUND OF THE INVENTION

The present invention relates generally to the field of cloud computing, and more particularly to the field of virtual server management within a cloud computing environment.

Cloud computing is known. Cloud computing is the delivery of computing as a service rather than a product, whereby shared resources, software, and information are provided to computers and other devices as a utility over a network (typically the Internet). An enabling technology for cloud computing is virtualization. Virtualization software allows a physical computing device to be electronically separated into one or more "virtual" devices, each of which can be easily used and managed to perform computing tasks. By using virtualization to essentially create a scalable system of multiple independent computing devices, physical computing devices can allocate and use computing resources more efficiently. Virtualization provides the agility required to speed up IT operations, and reduces cost by increasing infrastructure utilization.

Data center management is known. Data center management is the management of the storage, servers, and switches located within a data center. Although data center management may be performed by individuals (for example, data center managers), many data center management functions may also be performed by data center management solution software. One kind of known functionality provided by data center management solutions is the relocation of virtual servers/machines from one physical server to another.

SUMMARY

According to an aspect of the present invention, there is a method, computer program product and/or system that performs the following steps (not necessarily in the following order): (i) running a first customer application on a first set of virtual machine(s), with the first customer application including a first plurality of independently migratable elements, including a first independently migratable element and a second independently migratable element; (ii) dynamically checking a status of the first set of virtual machine(s) to determine whether a first migration condition exists; and (iii) on condition that the first migration condition exists, migrating the first independently migratable element to a second set of virtual machine(s) without migrating the second independently migratable element to the second set of virtual machine(s).

BRIEF DESCRIPTION OF THE DRAWINGS

FIG. 11 is a table view showing information that is generated by and helpful in understanding embodiments of the present invention;

FIG. 12 is a table view showing information that is generated by and helpful in understanding embodiments of the present invention;

FIG. 13 is a table view showing information that is generated by and helpful in understanding embodiments of the present invention;

FIG. 14 is a table view showing information that is generated by and helpful in understanding embodiments of the present invention;

FIG. 15 is a table view showing information that is generated by and helpful in understanding embodiments of the present invention; and FIG. 16 is a table view showing information that is generated by and helpful in understanding embodiments of the present invention.

DETAILED DESCRIPTION

Figure 1:
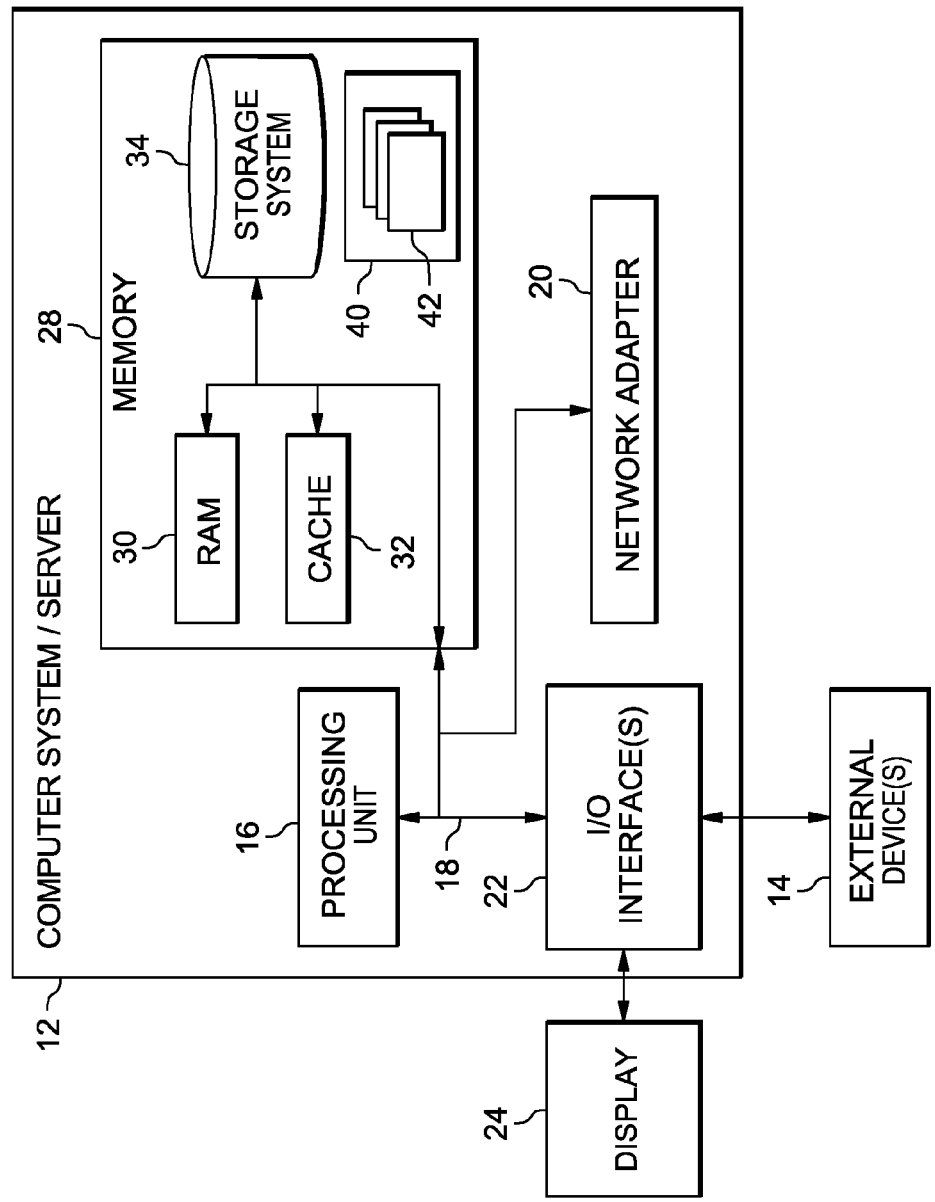
FIG. 1 depicts a cloud computing node used in a first embodiment of a system according to the present invention.

Migration of customer resources across physical servers typically requires the migration of entire customer applications or, in many cases, entire virtual machines. Some embodiments of the present invention migrate customer resources across physical servers at the application element level, allowing for the lightweight relocation of only the application elements that need to be migrated, and thereby minimizing the amount of overhead involved in the migration process. This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
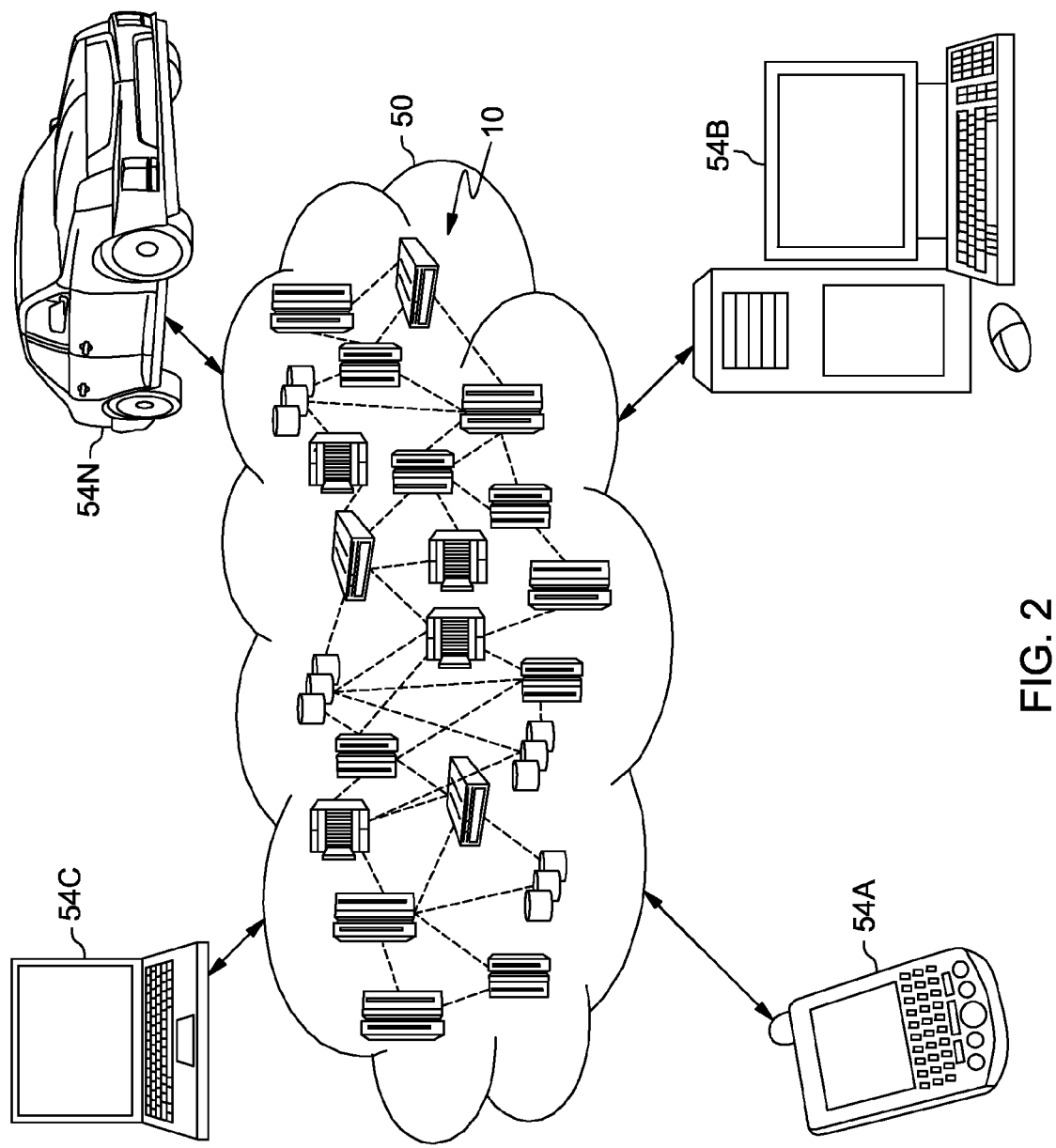
FIG. 2 depicts an embodiment of a cloud computing environment (also called the "first embodiment system") according to the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
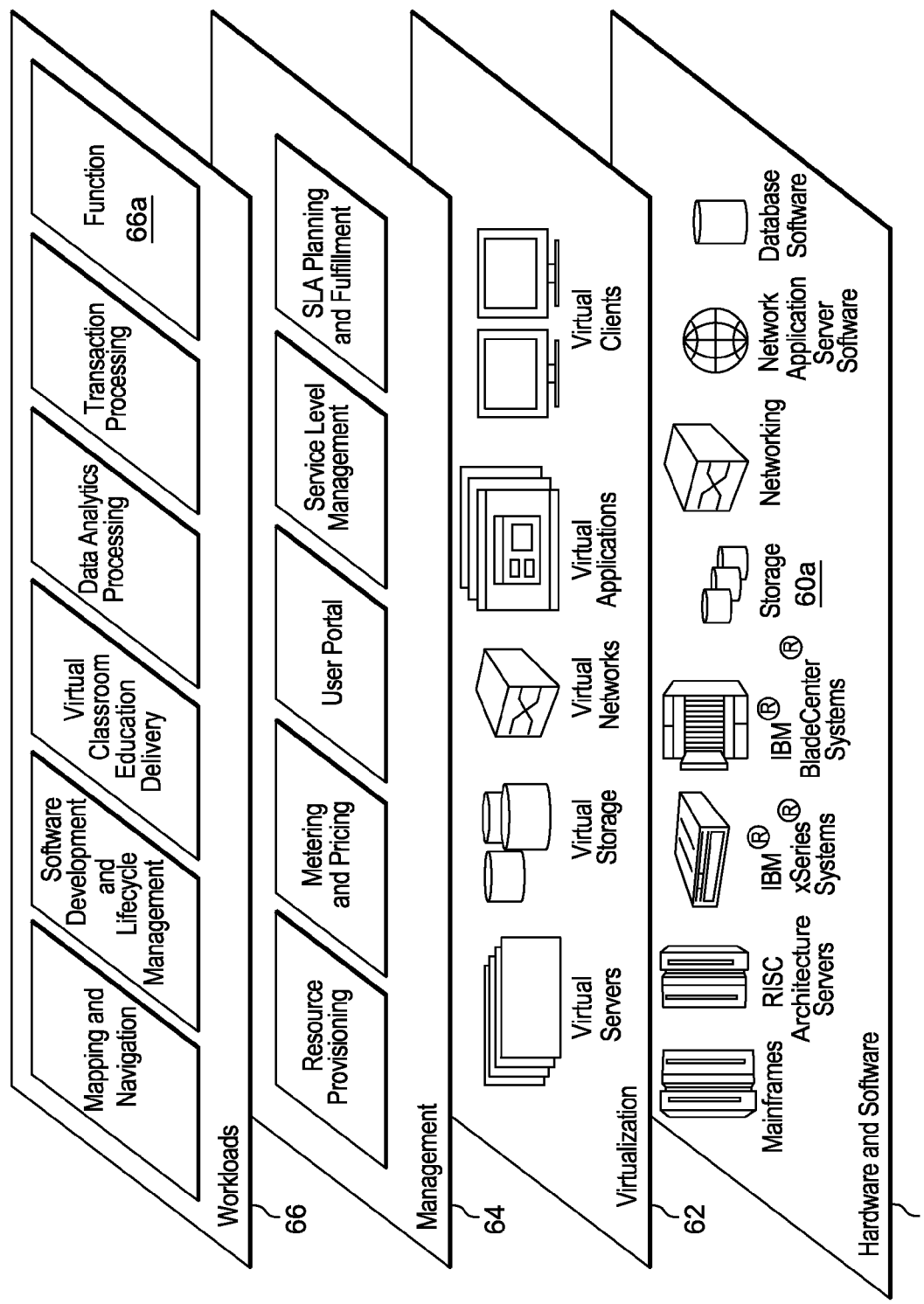
FIG. 3 depicts abstraction model layers used in the first embodiment system.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and functionality according to the present invention (see function block 66*a*) as will be discussed in detail, below, in the following sub-sections of this Detailed description section.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

II. Example Embodiment

Figure 4:
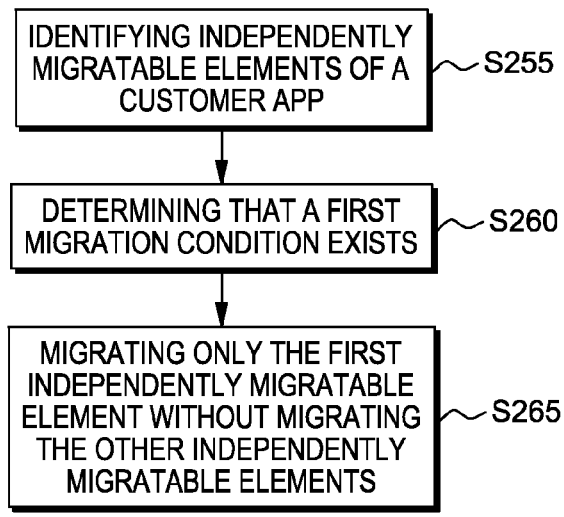
FIG. 4 is a flowchart showing a first embodiment method performed, at least in part, by the first embodiment system.
Figure 5:
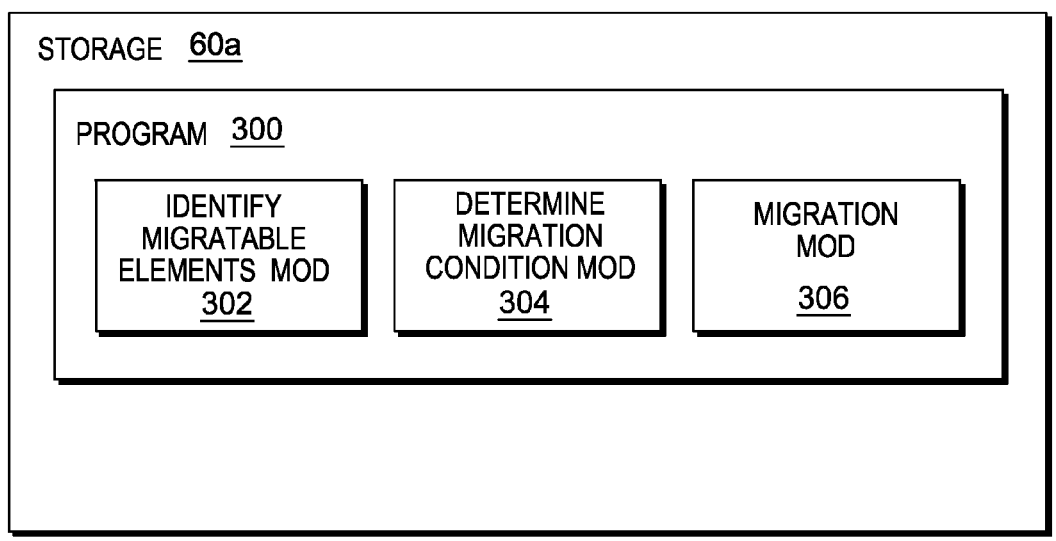
FIG. 5 is a block diagram view of a machine logic (for example, software) portion of the first embodiment system.

FIG. 4 shows flowchart 250 depicting a method according to the present invention. FIG. 5 shows program 300 for performing at least some of the method steps of flowchart 250. This method and associated software will now be discussed, over the course of the following paragraphs, with extensive reference to FIG. 4 (for the method step blocks) and FIG. 5 (for the software blocks). As shown in FIG. 4, one physical location where program 300 may be stored is in storage block 60a (see FIG. 3).

Processing begins at step S255, where identify migratable elements module ("mod") 302 identifies independently migratable elements of a customer application. As used in the present embodiment, the customer is a user and/or an owner of the customer application, and the customer application is an application located on a first set of virtual machines (VM). The first set of VM includes at least one VM located on at least one physical server, but may include a plurality of VM on one physical server; a plurality of VM on a plurality of physical servers; or any other possible combination of VM and servers. Independently migratable elements are any individual application elements (see Definitions sub-section of this Detailed Description) that may be migrated to another set of VM. In the present embodiment, the customer application includes three independently migratable elements (or IMEs): (i) an input portion; (ii) a processing portion; and (iii) an output portion.

In other embodiments of the present invention, the customer application may include a variety of alternative IMEs, as IMEs are not meant to be limited to traditionally migratable application elements. In some embodiments, IMEs include application resources such as computing (or processing), memory, network, and/or storage resources (an example of such an embodiment is discussed below in the Further Comments And/Or Embodiments Sub-Section of this Detailed Description). In other embodiments, the reverse may be true: IMEs may include the application code, instructions, and/or executables themselves, where the application is migrated but the application resources remain with the first set of VM. In still other embodiments (such as the present example embodiment), IMEs may include input/output elements of the application and/or any other element of the application adapted to communicate outside of the application.

Processing proceeds to step S260, where a determine migration condition mod 304 (see FIG. 5) determines that a first migration condition exists. When the condition is met, mod 304 identifies at least one IME to migrate (the "first migratable element") and searches for available destination VM (or sets of VM). In the present embodiment, the migration condition is that the customer application needs more processing resources than the first set of VM can provide. As such, mod 304 identifies the processing portion of the customer application for migration and searches for destination VM that can provide the required processing resources. After completing the search, mod 304 identifies a second set of VM as the destination for the processing portion.

In other embodiments of the present invention, migration conditions may include a wide range of possible conditions. In some embodiments, customer-specific and/or provider-specific conditions may exist. For example, on the customer (or application owner) side, migration conditions may be influenced by the following factors: (i) the maximization of application resource usage; (ii) the prioritization of application resources; and/or (iii) the cost of including application elements in various locations. On the provider (that is, the cloud services provider) side, migration conditions may be influenced by the following factors: (i) the conditions of physical servers; (ii) the physical/geographic location of various servers; and/or (iii) contract-related conditions (for example, contract terms preventing competing customers from having applications located on the same server. In still other embodiments of the present invention, a migration condition may have multiple sub-conditions, where more than one condition or subset of conditions must be met in order for processing to proceed to the next step.

Processing proceeds to step S265, where a migration mod 306 (see FIG. 5) migrates only the first migratable element (identified in step S260, discussed above) without migrating the other independently migratable elements (including, for example, a second migratable element). In the present embodiment, the first migratable element is the processing portion discussed above. In this step, mod 306 migrates the processing portion of the customer application to the second set of VM, without migrating the input portion or the output portion. As a result, the processing portion has access to the necessary processing resources without otherwise affecting the performance of the input portion and/or the output portion. Due to the migration, the customer application is able to operate more efficiently and effectively.

In this embodiment, the independently migratable element is not packaged, for remote communication, inside the larger image of a VM (for example, a VM copy of the source VM). Rather, the independently migratable element is sent to its remote destination as an independently migratable element data package. Alternatively, the entire source VM (including the migratable element to be migrated) may be created and communicated to its remote destination in the conventional way of communicating VMs over a communication network. Once the source VM is at the remote destination, the independently migratable element may be removed from the larger data set of its source VM.

The first migratable element may include any of the independently migratable elements discussed above. Additionally, the first migratable element may also include multiple IMEs, so long as at least one IME (identified as the second migratable element) is not included in the first migratable element. Furthermore, in other embodiments of the present invention, the migration mod 306 may also migrate the second migratable element (and/or any additional migratable elements). In these embodiments, the second migratable element (and/or any additional migratable elements) is migrated to a VM or a set of VM not included in the second set of VM (such as a third set of VM, a fourth set of VM, and/or a fifth set of VM).

Upon completing step S265, processing for method 250 completes. However, in some embodiments, system 12 is adapted to continually and dynamically monitor VM to determine additional migration conditions and repeat steps S255, S260, and S265. For example, in some embodiments, it is contemplated that system 12 will continually monitor all applications for a given customer (or multiple customers) across a wide range of VM located on one or more physical servers. In doing so, system 12 may execute method 250 for a plurality of iterations, with the iterations occurring sequentially, consecutively, or otherwise, depending on VM conditions at a given time. As a result, the processing portion (the first migratable element) of the above example embodiment may ultimately be migrated back to its original first set of VM, or the processing portion may be migrated to another set of VM such as the third set of VM, the fourth set of VM, or the fifth set of VM.

III. Further Comments and/or Embodiments

Some embodiments of the present invention recognize the following facts, potential problems and/or potential areas for improvement with respect to the current state of the art: (i) with existing virtual server (VS) relocation methods, everything associated with a VS is completely relocated from one physical server to another, including a software stack, metadata, vLAN (virtual local area network) configuration, and storage logical unit numbers (physical or virtual); (ii) in many cases (especially in a cloud environment), users are interested in migration of specific applications (and corresponding data) only instead of migration of an entire virtual server; (iii) no mechanisms exist to smartly migrate applications and/or resources for load-balancing or optimization at resource granularity fashion without any disruption; (iv) currently conventional systems do not have infrastructure capable of performing dependency analysis for impact, disruption/non-disruption, and threshold monitoring at an application resource granularity level; (v) it may be difficult to find a VM which can fulfill all resource requirements for a given application; (vi) existing mechanisms are not applicable in multi-tenant environments where different customers share the same VM; and/or (vii) currently conventional systems do not consider workload and static/dynamic resource utilization for determining a suitable list of applications eligible for moving to another machine.

Some embodiments of the present invention may include one, or more, of the following features, characteristics and/or advantages: (i) lightweight operation (relocating only some applications or parts of applications instead of an entire VM); (ii) quicker completion of user operations; (iii) enhanced user control; (iv) the ability to allow the user to quickly get an application from a running VS to another VS without going through the process of application installation; (v) in case of a disaster, using the invention to identify critical applications and automatically relocate them (and only them); and/or (vi) performing analytics and/or data-driven migration.

Some embodiments of the present invention may include one, or more, of the following additional features, characteristics and/or advantages: (i) a framework that defines generation and maintenance of test containers in a factory model based on the continuous analysis of the complete environment; (ii) a framework that uses an innovative combination of virtualization and data-protection technologies; (iii) test containers that can be restored/retrieved from a central location on-demand on a complete/partial (closest match) basis in a service-provider model; and/or (iv) a framework that continuously scans its environment to build a repository of containers based on dependencies and threshold.

In many embodiments of the present invention, customer applications in a cloud application model are dynamically relocated based on an intelligent decision making mechanism. The relocation occurs across virtual and/or physical locations, (including multi-tenant environments) and can be done at either the application level or at a subset of the application's resource infrastructure. This allows a customer to have better application resource management, efficient virtual machine utilization, and/or better quality of service.

The intelligent decision making mechanism of the present invention includes dynamic profiles of the following: (i) applications owned by a customer; and (ii) available VM that are able to run applications. The dynamic profile for an application is determined by observing application resource usage and guaranteed resource availability. The dynamic profile for the VM is determined based on the availability and/or usage of various system resources.

Automatic relocation decision logic may be based on one or more of the following: (i) grouping applications of the same customer running across same/different VM, physical hosts, or cloud sites; (ii) assessing the dynamic resource usage, access patterns, and/or traffic patterns of applications; (iii) assessing VM from the availability/usage of given resources; (iv) leveraging information from management applications on the storage and network environment; (v) checking whether migration of application(s) (or a subset of application resources) from one VM to another VM is possible; (vi) determining whether migration is one-time or based on some schedule; and/or (vii) contacting a cloud application migration interface.

Figure 6:
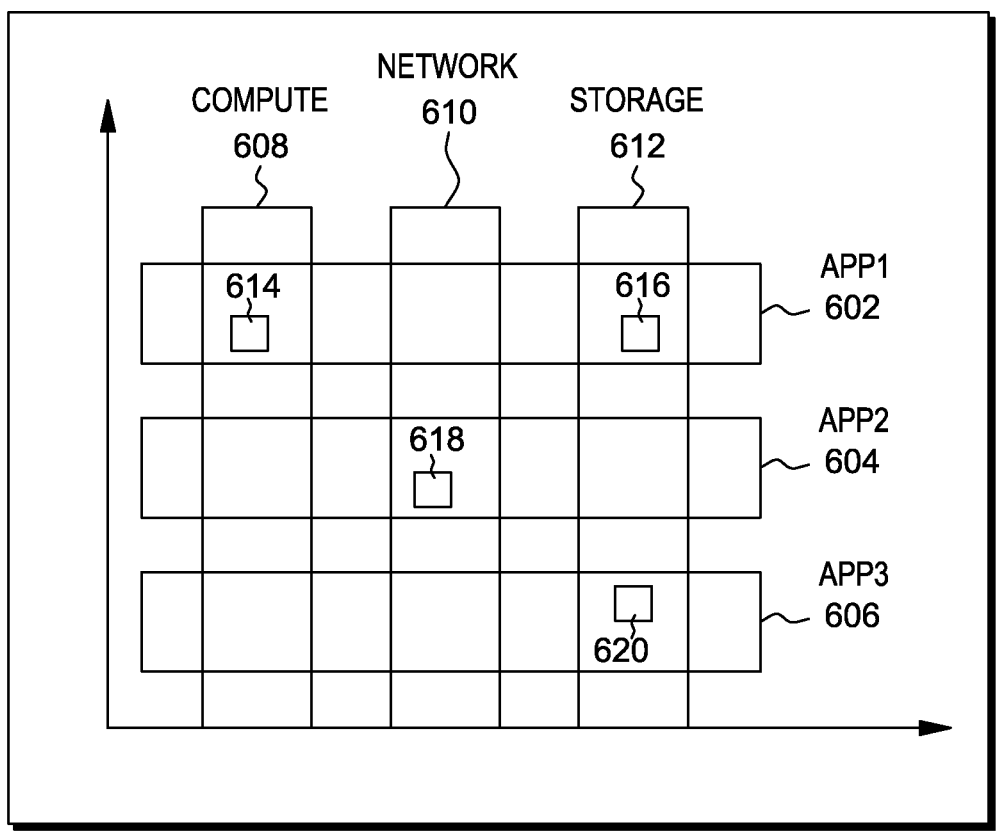
FIG. 6 is a diagram view showing information that is helpful in understanding embodiments of the present invention.

In many embodiments of the present invention, system applications require computing resources, network resources, and storage resources. FIG. 6 shows Infrastructure as a Service Resource Map 600 which includes a representation of applications and their corresponding resources on a VM. More specifically, rows 602, 604, and 606 show the resources used for App1, App2, and App3, respectively. Columns 608, 610, and 612 show computing (or compute) resources, network resources, and storage resources, respectively. Map 600 also identifies the following specific resources: (i) App1 computing resource 614; (ii) App1 storage resource 616; (iii) App2 network resource 618; and (iv) App3 storage resource 620. In the present embodiment, migration may occur at the application level (for example, by migrating all of App1's resources 602). Migration may also occur for a set of resources for a single application (for example, by migrating App1's computing resource 614) or for multiple applications (for example, by migrating all computing resources 608). By having this granular topology of applications and associated Infrastructure as a Service along with cloud multi-tenancy, the present invention allows for intelligent migration for load-balancing or optimization (performance/cost upgrade/downgrade) at very granular fashion.

In some embodiments of the present invention, automatic relocation decisions may be made based on the following analyses: (i) grouping applications of the same customer when those applications are running across the same/different VM, physical hosts, or cloud sites; (ii) assessing the dynamic resource usage of applications and access/traffic patterns; (iii) assessing VM from the availability/usage of given resources and by leveraging information from management applications on the storage and network environment; (iv) checking for the possibility of migration of applications or application resources from one VM to another VM; (v) determining whether migration happens one time or multiple times based on some schedule; (vi) initiating migration by contacting a cloud application migration interface; and/or (vii) providing, based on policy and load balancing requirements, a list of other VM where a customer may migrate applications to.

Figure 7:
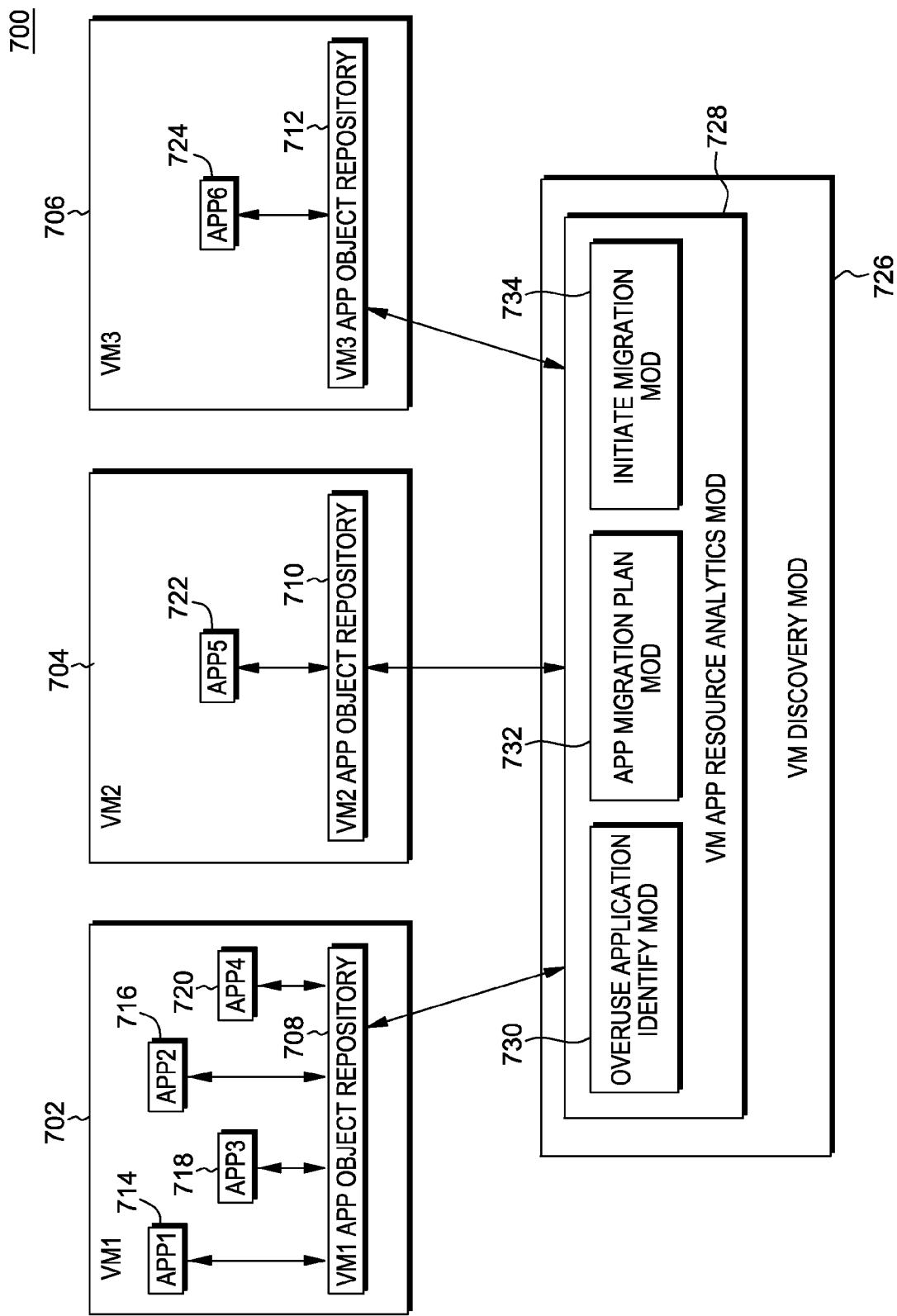
FIG. 7 is a block diagram view of a system according to the present invention.

As shown in FIG. 7, system 700 includes: three VM 702, 704, 706; and VM discovery module 726. VM 702 includes App1 714, App2 716, App3 718, App4 720, and VM1 App Object Repository 708. VM 704 includes: App5 722 and VM2 App Object Repository 710. VM 706 includes: App6 724 and VM3 App Object Repository 712. VM1 App Object Repository 708, VM2 App Object Repository 710, and VM3 App Object Repository 712 are also referred to as "App Object Repositories" and/or "AOR". VM discovery module 726 (also referred to as "discovery module" and/or "DM") includes VM app resource analytics module 728 (also referred to as "analytics module" and/or "ARAM"), and ARAM 728 includes overuse application identify module 730 (or "AIM"), application migration plan module 732 (or "AMPM"), and initiate migrate module 734 (or "IMM"). System 700 will now be discussed with reference to FIGS. 7 to 16, which show an example embodiment of the present invention.

Each AOR 708, 710, 712 is adapted to monitor resource usage, resource storage, and network traffic on a per-application basis and send that information to the analytics module 728. In the present embodiment, ARAM 728 collects statistics on the following: (i) customer usage; (ii) customer resource availability; and/or (ii) traffic patterns. ARAM 728 uses this collected information to check for the possibility of app migration on a VM or customer level. If ARAM 728 determines that migration should occur, it instructs facilitator module(s) of the respective VM(s) to initiate the given migration, and the AOR of the given VM contacts a customer management interface to perform the migration.

Still referring to FIG. 7, overuse application identify module 730, app migration plan module 732, and initiate migration module 734 are adapted to assist the ARAM 728 in making app migration decisions. Some methods utilized by these modules (or "mods") are discussed below and illustrated in FIGS. 8 to 10.

FIGS. 11 to 16 show tables that are helpful in understanding the present embodiment. Specifically, FIG. 11 shows a VM database static table 1100. This table 1100 is maintained by the discovery module 726 (see FIG. 7). Table 1100 stores information about resource capacity of each VM (702, 704, 706) running in the system. When a new VM is created, a new entry is added to this table 1100.

FIG. 12 shows a VM database dynamic table 1200. This table 1200 is also maintained by the discovery module 726 (see FIG. 7). Table 1200 stores information about dynamic resource usage of each VM (702, 704, 706) running in the system. Entries to this table 1200 are updated periodically based on a monitoring interval.

FIG. 13 shows an application location information table 1300. This table 1300 is maintained at a cloud provider, and stores location information for customer applications (714, 716, 718, 720, 722, 724).

FIG. 14 shows an application profile static table 1400. This table 1400 is maintained at the cloud provider, and stores resource information for customer applications (714, 716, 718, 720, 722, 724). The resource information is generally in the form of a minimum and a maximum value, and is typically based on the quality of service agreements for the applications' respective customers.

FIG. 15 shows an application profile dynamic table 1500. This table 1500 is maintained at the analytics module 728 within the discovery module 726 (see FIG. 7). The table 1500 stores information about current resource usage of a given application (714, 716, 718, 720, 722, 724), received periodically from the app object repository (708, 710, 712) of the VM (702, 704, 706) the application (714, 716, 718, 720, 722, 724) is located on.

FIG. 16 shows a customer allowed VM table 1600. This table 1600 is maintained at the cloud provider, and stores a list of VM (such as VM 702, 704, 706) where given customers (such as Customer1, Customer2) are permitted to install/launch/store applications. The table 1600 is created based on one or more cloud provider policies and/or customer service agreements. An example of a cloud provider policy would be a policy that forbids competing customers from sharing the same VM for their respective apps.

Figure 8:
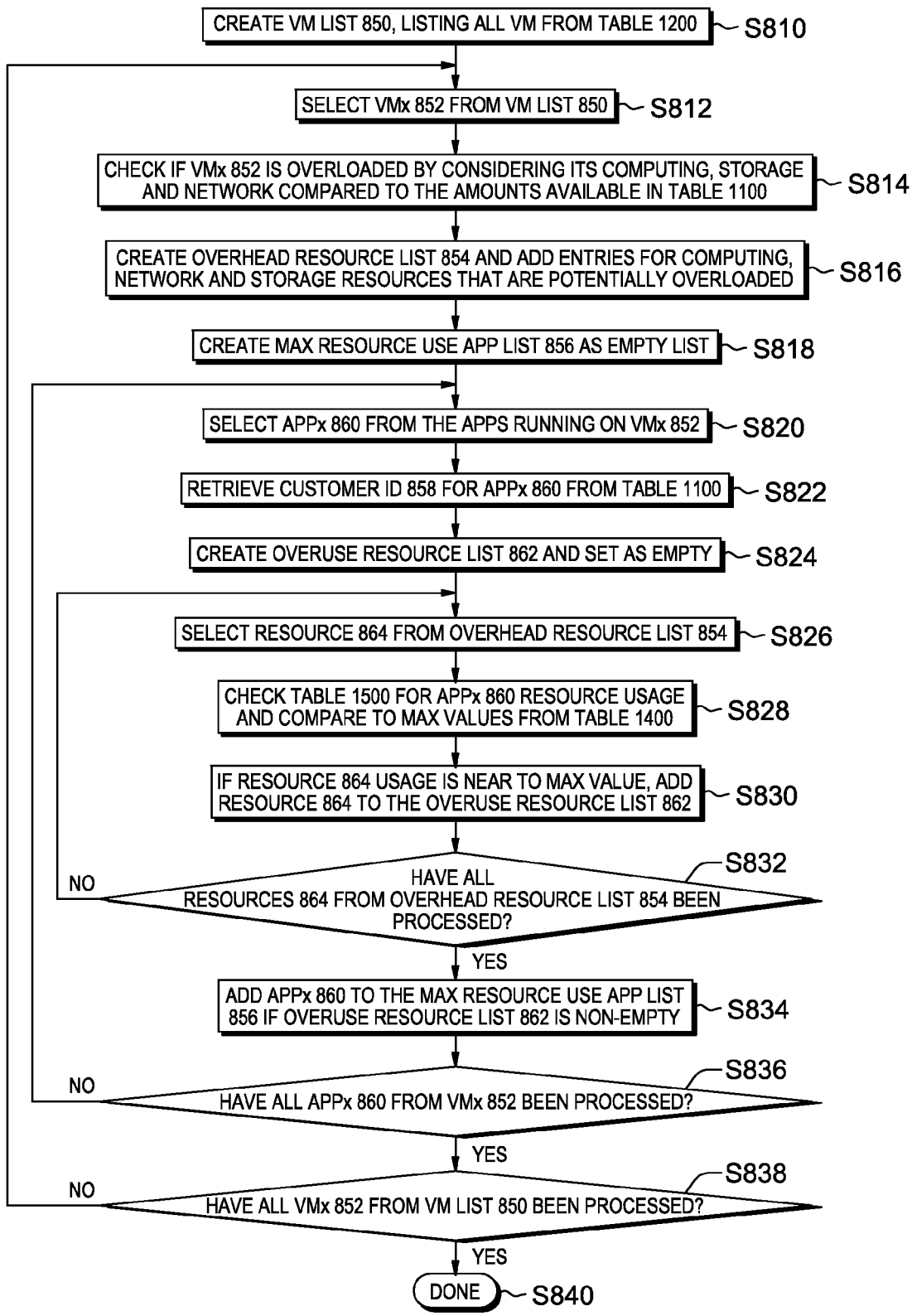
FIG. 8 is a flowchart showing a method performed, at least in part, by a system according to the present invention.
Figure 9:
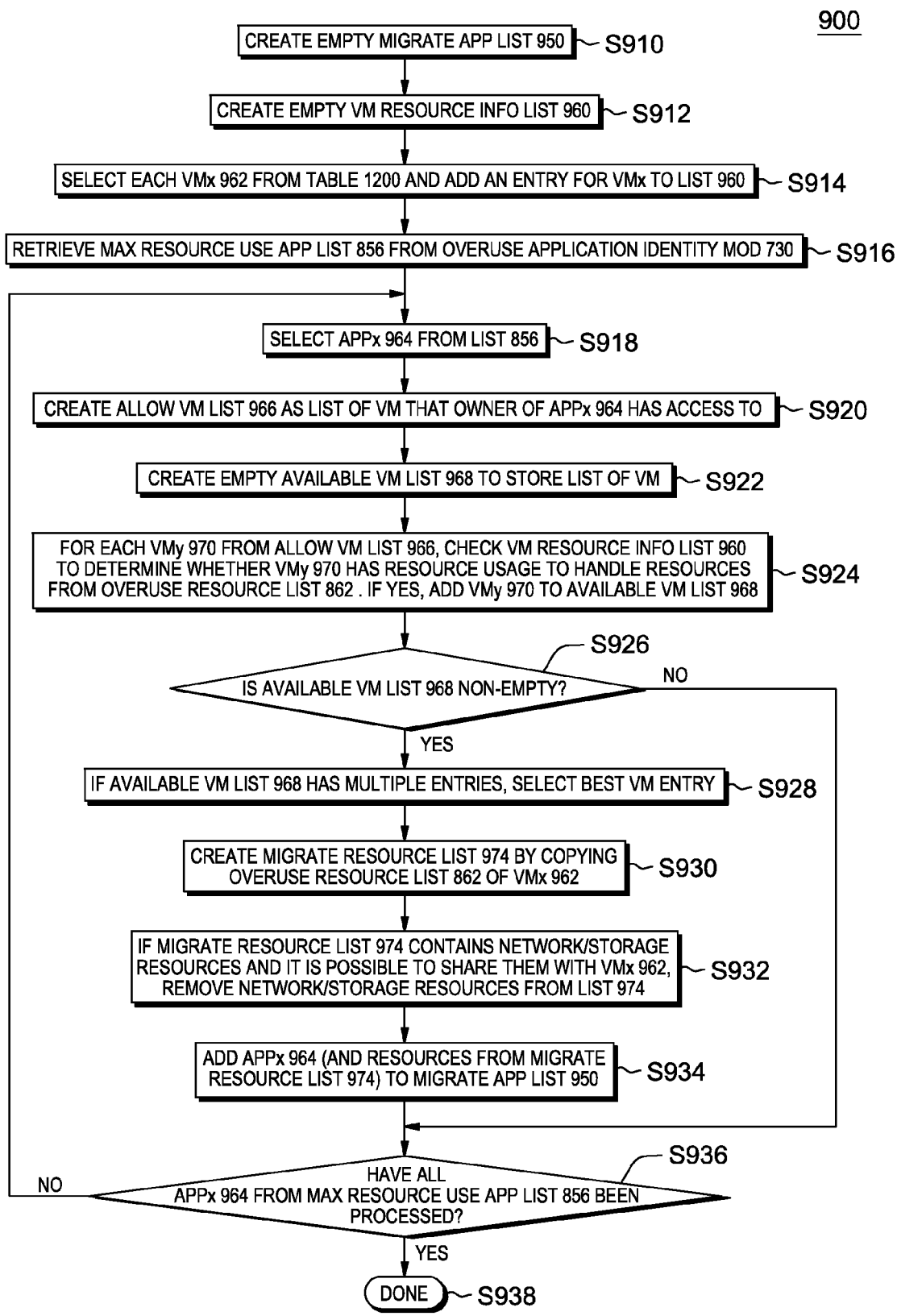
FIG. 9 is a flowchart showing a method performed, at least in part, by a system according to the present invention.
Figure 10:
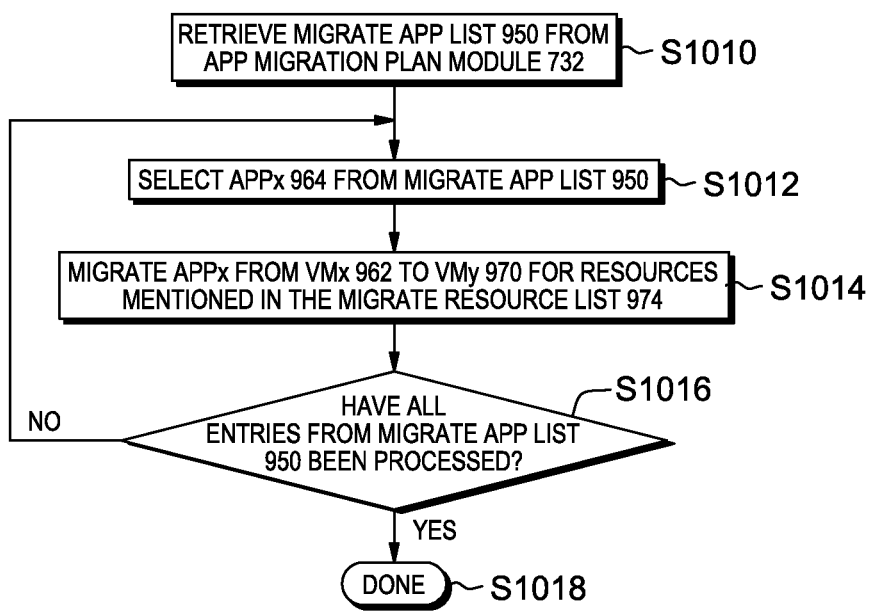
FIG. 10 is a flowchart showing a method performed, at least in part, by a system according to the present invention.

In the present embodiment, the overuse application identify module 730 (or "AIM") is adapted to execute the method 800 shown in FIG. 8. A purpose of this method 800 is to identify applications that are potentially overusing VM resources and are therefore eligible for transfer to another VM. Processing begins with step S810, where a VM list 850 is created, listing all VM (702, 704, 706) present in this embodiment and listed in table 1200 (see FIG. 12).

The first goal of method 800 is to identify VM that are potentially overloaded. Processing proceeds to step S812 (see FIG. 8), where a VMx 852 from the VM list 850 is selected. Processing then proceeds to step S814, where the AIM 730 (see FIG. 7) checks if VMx 852 is overloaded by considering the computing, network, and storage usage of VMx 852 (see FIG. 6 for a diagram of example computing, network, and storage usage). The computing, network, and storage usage of VMx 852 is then compared to the overall available amounts of computing, network, and storage resources contained in table 1100 (see FIG. 11). Processing proceeds to step S816, where an overhead resource list 854 is created and entries are added to the list 854 for any computing, network, and/or storage resources that are potentially overloaded.

Once a VM (VMx 852) has been identified, the next task for method 800 is to identify specific apps on VMx 852 that may be overloaded. Processing proceeds to step S818 (see FIG. 8), where a max resource use app list 856 is created to store an application list. Although the list 856 is initially empty, future entries in list 856 will contain the following three items: (i) a customer ID 858; (ii) an APPx 860; and (iii) an overuse resource list 862. Processing then proceeds to step S820, where an application (APPx 860) is selected from the apps located on VMx 852. Processing proceeds to step S822, where the customer ID 858 for APPx 860 is retrieved from table 1100 (see FIG. 11). Processing proceeds to step S824, where the overuse resource list 862 for APPx 860 is set to empty.

Once APPx 860 has been identified, method 800 determines which resources for APPx 860 are overloaded. Processing proceeds to step S826 (see FIG. 8), where a resource 864 is selected from overhead resource list 854. Processing then proceeds to step S828, where the AIM 730 checks table 1500 (see FIG. 15) for APPx 860 resource usage and compares that usage to the max values contained in table 1400 (see FIG. 14). Processing then proceeds to step S830. If a given resource's 864 usage is near to its max value, the resource 864 is added to overuse resource list 862. Processing then proceeds to step S832, where the AIM 730 checks if all resources from overhead resource list 854 have processed through the previous steps S828 and S830. If not all resources have been processed (NO), processing returns to step S826 and a new resource is selected.

Once all resources have been processed (YES), processing proceeds to step S834 (see FIG. 8). In this step, the AIM 730 checks if the overuse resource list 862 is non-empty. If so (that is, if the list 862 contains any entries), the APPx 860 is added to the max resource use app list 856. This new entry contains the following items: (i) VMx 852; (ii) customer ID 858; (iii) APPx 860; and (iv) overuse resource list 862. By adding APPx 860 to max resource use app list 856, method 800 is identifying APPx 860 as an app that is overloaded.

Processing proceeds to step S836, where the AIM 730 checks if all apps from VMx 852 have processed through the previous steps S822 through S834. If not all apps have been processed (NO), processing returns to step S820 and a new APPx 860 is selected.

Once all apps have been processed (YES), processing proceeds to step S838. In this step, the AIM 730 checks if all VM have processed through the previous steps S814 through S836. If not all VM have been processed (NO), processing returns to step S812 and a new VMx 852 is selected. In the present embodiment, this means that every VM will be processed through steps S814 through S836 to determine whether it has eligible apps for transfer. However, in other embodiments, step S838 may check for different criteria. For example, in one alternate embodiment, step S838 may only check to see if all VM used by a particular customer (for example, Customer1 or Customer2) have been processed. This may be helpful in situations where only a specific customer's applications and/or resources are being monitored.

Once all VM have been processed (YES), processing proceeds to step S840, where method 800 completes operation. As a result of executing the method 800, the max resource use app list 856 contains a list of overloaded applications eligible for transfer, along with a list of their corresponding application resources eligible to be transferred.

Once applications have been identified for transfer, the next step is to identify possible destinations for those applications. Referring still to the present embodiment, the app migration plan module 732 (AMPM) (see FIG. 7) is adapted to execute the method 900 shown in FIG. 9. A purpose of this method 900 is to determine eligible destination VM for applications identified for transfer by method 800. Processing begins at step S910, where an empty migrate app list 950 is created. This list 950 will contain applications eligible for migration from one VM to another VM, and will store the following items for each entry: (i) an application 952; (ii) the application's current VM 954; (iii) the application's next VM 956; and/or (iv) a migrate resources list 958. Processing proceeds to step S912, where an empty VM resource info list 960 is created to store incremental VM resource information.

Processing then proceeds to step S914, where each VMx 962 is selected from table 1200 (see FIG. 12) and added to list 960 along with its corresponding resource usage. Each entry contains the following items: (i) VMx 962; (ii) computing usage from table 1200 (see FIG. 12); (iii) network usage from table 1200 (see FIG. 12); and (iv) storage usage from table 1200 (see FIG. 12).

Processing proceeds to step S916, where the max resource use app list 856 (the list of applications to transfer) from the overuse application identify module 730 (see FIG. 7) is retrieved. Processing then proceeds to step S918, where the AMPM 732 selects an app (APPx 964) from the list 856.

Processing proceeds to step S920 (see FIG. 9), where an allow VM list 966 is created. List 966 is a list of VM where the customer that owns APPx 964 is able to install/launch/store apps (not including the current VMx 962). In this step, the method 900 may reference table 1600 (see FIG. 16), which shows the allowable VM associated with each customer (Customer1, Customer2), to create list 966.

Processing proceeds to step S922 (see FIG. 9), where an empty available VM list 968 is created to store a list of potential destination VM. Processing proceeds to step S924, where for each VMy 970 from allow VM list 966, AMPM 732 checks VM resource info list 960 to determine whether VMy 970 has less usage for all resources than the resources listed in the overuse resource list 854. If VMy 970 has less usage than the resources listed in list 854, VMy 970 is added to available VM list 968.

Processing proceeds to step S926, where the AMPM 732 checks if the available VM list 968 is non-empty. If the list 968 is non-empty (YES), processing proceeds to step S928 (if NO, processing proceeds to step S936, discussed below). In step S928, the AMPM 732 checks if the list 968 has multiple entries. If not, then the sole entry is selected (and identified as VMy 970). If there are multiple entries, the AMPM 732 selects the best VM entry (VMy 970) by looking at resource usage and whether the VM may share storage or network resources, for example.

Processing proceeds to step S930, where a migrate resource list 974 is created and populated with the existing values from the overuse resource list 854 (see FIG. 8) for VMx 962. Processing then proceeds to step S932, where the AMPM 732 checks if the list 974 contains any network resources that may possibly be shared with VMx 962. If so, that network resource is removed from the migrate resource list 974. Similarly, during this step the AMPM 732 checks if the list 974 contains any storage resources that may possibly be shared with VMx 962. If so, the storage resource is removed from migrate resource list 974.

Processing proceeds to step S934, where APPx 964 is added to the Migrate App List 950. The new entry for APPx 964 in list 950 includes the following items: (i) APPx 964; (ii) VMx 962; (iii) VMy 970; and (iv) migrate resource list 974.

Processing then proceeds to step S936, where the AMPM 732 checks whether all apps from the max resource use app list 856 (see FIG. 8) have been processed through steps S920 to S936. If not all apps have been processed (NO), processing returns back to step S918 and a new APPx 964 is selected. If all apps have been processed (YES), processing proceeds to step S938, where the method 900 completes operation. As a result of executing method 900, migrate resource list 974 includes a list of applications (and application resources) to transfer along with their corresponding destination VM.

Once applications and their respective destinations have been identified, the next step is to perform the actual migration. The migration is performed by initiate migration module 734 (IMM), which executes method 1000 shown in FIG. 10. Processing begins with step S1010, where the IMM 734 retrieves the migrate app list 950 from the app migration plan module 732 (see FIG. 7). Processing proceeds to step S1012, where an entry from the migrate app list 950 is selected. Processing proceeds to step S1014, where an existing app migration tool 1050 is used to initiate migration of APPx 964 from VMx 962 to VMy 970 based on the information contained in migrate resource list 974 (see FIG. 9). Processing proceeds to step S1016, where the IMM 734 checks whether all entries from migrate app list 950 have been processed via step S1014. If not (NO), processing returns to step S1012 and a new entry is selected. If all entries have been processed (YES), however, processing continues to step S1018, where method 1000 completes operation, as the application migration has completed.

The preceding paragraphs refer to the computing, storage, and network usage of given applications on a VM. This usage information can be collected by the app object repositories (708, 710, 712) in a number of ways. In some embodiments, application-specific tools may be used (for example, advanced applications may provide interfaces in /proc or /sysfs filesystems). Some additional tools/methods for obtaining this information are as follows: (i) computing information for the application may be collected by using commands like "TOP" on linux, which provides information on how much CPU a given application and its sub-processes are using; (ii) storage information for the application may be collected based on storage capacity used for a given storage logical unit number (LUN); and (iii) network information may be collected using tools like "tcpdump" and knowing the port under which application traffic is active. Regardless of the collection method, however, the app object repository (708, 710, 712) will periodically collect and send this information to the resource analytics module 728 and update table 1500 (see FIG. 15) accordingly.

Additionally, VM resource usage may be monitored by the VM discovery module 726 (see FIG. 7). Existing discovery modules 726 already have a mechanism for monitoring resource usage of each VM. The usage data can be utilized as described in Table 1200 (see FIG. 12).

In conclusion, some embodiments of the present invention provide a mechanism for grouping applications of the same customer running across different VMs, physical hosts, and/or cloud locations. This allows system 12 to assess the dynamic resource usage, access patterns, and/or traffic patterns for the grouped applications as a whole. Furthermore, in many embodiments of the present invention, relocation across VMs may occur at an application level or at a subset of the application resource infrastructure. This application (and sub-application) based relocation provides the following benefits: (i) better application resource management; (ii) efficient virtual machine utilization; (iii) better quality of service; (iv) lightweight operation (by only relocating applications or application parts instead of the entire VM); and/or (v) enhanced user control (allowing a user to quickly move an application running on one virtual server to another without having to go through the process of application installation).

DEFINITIONS

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

Application element: any portion of a computer program that can be physically, virtually, or conceptually separated from the physical or virtual location of the computer program, including, but not limited to: (i) application resources such as computing (or processing), memory, network, and/or storage resources; (ii) application source code, instructions, and/or executable files; and/or (iii) input/output portions, or any portions adapted to communicate outside of the application.

What is claimed is:

1. A method comprising:
running a first customer application on a first virtual machine on a first physical server, with the first customer application including a first plurality of independently migratable elements, including a first independently migratable element that utilizes a first computing resource on the first virtual machine and a second independently migratable element that utilizes a second computing resource on the first virtual machine;
dynamically checking a status of the first virtual machine to determine whether a first migration condition exists, where the first migration condition is found to exist when an available amount of the first computing resource on the first virtual machine is determined to be less than an available amount of a computing resource that is similar to the first computing resource on a second virtual machine on a second physical server; and
on condition that the first migration condition exists, migrating the first independently migratable element to the second virtual machine on the second physical server without migrating the second independently migratable element to the second virtual machine and without migrating the first virtual machine, such that the first independently migratable element is able to utilize the computing resource that is similar to the first computing resource on the second virtual machine on the second physical server while the second independently migratable element remains able to utilize the second computing resource on the first virtual machine on the first physical server.

2. The method of claim 1, wherein:
the dynamic checking of the status of the first virtual machine occurs while the first customer application is running on the first virtual machine.

3. The method of claim 1, wherein:
the first customer application is included in a grouped set of customer application(s) running on the first virtual machine.

4. The method of claim 1, wherein:
the first virtual machine and the second virtual machine are each adapted to permit multiple customers to own application(s) thereon.

5. The method of claim 1, further comprising:
dynamically checking the status of the first virtual machine to determine whether a second migration condition exits, where the second migration condition is found to exist when a cost of utilizing the second computing resource on the first virtual machine is determined to be higher than a cost of utilizing a computing resource that is similar to the second computing resource on a third virtual machine on a third physical server; and
on condition that the second migration condition exists, migrating the second independently migratable element to the third virtual machine.

6. The method of claim 1, further comprising:
dynamically checking the status of the first virtual machine to determine whether a second migration condition exits, where the second migration condition is found to exist when an available amount of the second computing resource on the first virtual machine is determined to be less than an available amount of a computing resource that is similar to the second computing resource on a third virtual machine on a third physical server; and
on condition that the second migration condition exists, migrating the second independently migratable element to the third virtual machine.

7. The method of claim 1, further comprising:
dynamically checking the status of the first virtual machine to determine whether a second migration condition exits, where the second migration condition is found to exist when a cost of utilizing the first computing resource on the first virtual machine is determined to be higher than a cost of utilizing the computing resource that is similar to the first computing resource on the second virtual machine on the second physical server;
wherein the migrating of the first independently migratable element to the second virtual machine on the second physical server is further conditioned on a determination that the second migration condition exists.

8. The method of claim 7, further comprising:
dynamically checking the status of the first virtual machine to determine whether a third migration condition exits, where the third migration condition is found to exist when the second physical server is in a permitted geographic location for the first customer application; and
dynamically checking the status of the first virtual machine to determine whether a fourth migration condition exits, where the fourth migration condition is found to exist when the second physical server meets a set of contract-related condition(s) for the first customer application, the set of contract-related condition(s) including a condition preventing competing customers from having applications located on the same physical server;
wherein the migrating of the first independently migratable element to the second virtual machine on the second physical server is further conditioned on a determination that the third migration condition and the fourth migration condition exist.

9. A computer program product comprising a computer readable storage medium having stored thereon:
program instructions programmed to run a first customer application on a first virtual machine on a first physical server, with the first customer application including a first plurality of independently migratable elements, including a first independently migratable element that utilizes a first computing resource on the first virtual machine and a second independently migratable element that utilizes a second computing resource on the first virtual machine;
program instructions programmed to dynamically check a status of the first virtual machine to determine whether a first migration condition exists, where the first migration condition is found to exist when an available amount of the first computing resource on the first virtual machine is determined to be less than an available amount of a computing resource that is similar to the first computing resource on a second virtual machine on a second physical server; and
program instructions programmed to, on condition that the first migration condition exists, migrate the first independently migratable element to the second virtual machine on the second physical server without migrating the second independently migratable element to the second virtual machine and without migrating the first virtual machine, such that the first independently migratable element is able to utilize the computing resource that is similar to the first computing resource on the second virtual machine on the second physical server while the second independently migratable element remains able to utilize the second computing resource on the first virtual machine on the first physical server.

10. The computer program product of claim 9, wherein:
the dynamic checking of the status of the first virtual machine occurs while the first customer application is running on the first virtual machine.

11. The computer program product of claim 9, wherein:
the first customer application is included in a grouped set of customer application(s) running on the first virtual machine.

12. The computer program product of claim 9, wherein:
the first virtual machine and the second virtual machine are each adapted to permit multiple customers to own application(s) thereon.

13. The computer program product of claim 9, further comprising:
program instructions programmed to dynamically check the status of the first virtual machine to determine whether a second migration condition exits, where the second migration condition is found to exist when a cost of utilizing the second computing resource on the first virtual machine is determined to be higher than a cost of utilizing a computing resource that is similar to the second computing resource on a third virtual machine on a third physical server; and
program instructions programmed to, on condition that the second migration condition exists, migrate the second independently migratable element to the third virtual machine.

14. The computer program product of claim 9, further comprising:
program instructions programmed to dynamically check the status of the first virtual machine to determine whether a second migration condition exits, where the second migration condition is found to exist when an available amount of the second computing resource on the first virtual machine is determined to be less than an available amount of a computing resource that is similar to the second computing resource on a third virtual machine on a third physical server; and program instructions programmed to, on condition that the second migration condition exists, migrate the second independently migratable element to the third virtual machine.

15. A computer system comprising:
a processor(s) set; and
a computer readable storage medium;
wherein:
the processor set is structured, located, connected and/or programmed to run program instructions stored on the computer readable storage medium; and
the program instructions include:
program instructions programmed to run a first customer application on a first virtual machine on a first physical server, with the first customer application including a first plurality of independently migratable elements, including a first independently migratable element that utilizes a first computing resource on the first virtual machine and a second independently migratable element that utilizes a second computing resource on the first virtual machine;
program instructions programmed to dynamically check a status of the first virtual machine to determine whether a first migration condition exists, where the first migration condition is found to exist when an available amount of the first computing resource on the first virtual machine is determined to be less than an available amount of a computing resource that is similar to the first computing resource on a second virtual machine on a second physical server; and
program instructions programmed to, on condition that the first migration condition exists, migrate the first independently migratable element to the second virtual machine on the second physical server without migrating the second independently migratable element to the second virtual machine and without migrating the first virtual machine, such that the first independently migratable element is able to utilize the computing resource that is similar to the first computing resource on the second virtual machine on the second physical server while the second independently migratable element remains able to utilize the second computing resource on the first virtual machine on the first physical server.

16. The computer system of claim 15, wherein:
the dynamic checking of the status of the first virtual machine occurs while the first customer application is running on the first virtual machine.

17. The computer system of claim 15, wherein:
the first customer application is included in a grouped set of customer application(s) running on the first virtual machine.

18. The computer system of claim 15, wherein:
the first virtual machine and the second virtual machine are each adapted to permit multiple customers to own application(s) thereon.

19. The computer system of claim 15, further comprising:
program instructions programmed to dynamically check the status of the first virtual machine to determine whether a second migration condition exits, where the second migration condition is found to exist when a cost of utilizing the second computing resource on the first virtual machine is determined to be higher than a cost of utilizing a computing resource that is similar to the second computing resource on a third virtual machine on a third physical server; and
program instructions programmed to, on condition that the second migration condition exists, migrate the second independently migratable element to the third virtual machine.

20. The computer system of claim 15, further comprising:
program instructions programmed to dynamically check the status of the first virtual machine to determine whether a second migration condition exits, where the second migration condition is found to exist when an available amount of the second computing resource on the first virtual machine is determined to be less than an available amount of a computing resource that is similar to the second computing resource on a third virtual machine on a third physical server; and
program instructions programmed to, on condition that the second migration condition exists, migrate the second independently migratable element to the third virtual machine.

* * * * *